April 23, 1968     J. P. FRYSZTAK     3,379,958
TRANSISTORIZED VOLTAGE REGULATOR PROVIDING REVERSE
BIAS FOR OUTPUT TRANSISTOR
Filed June 25, 1964
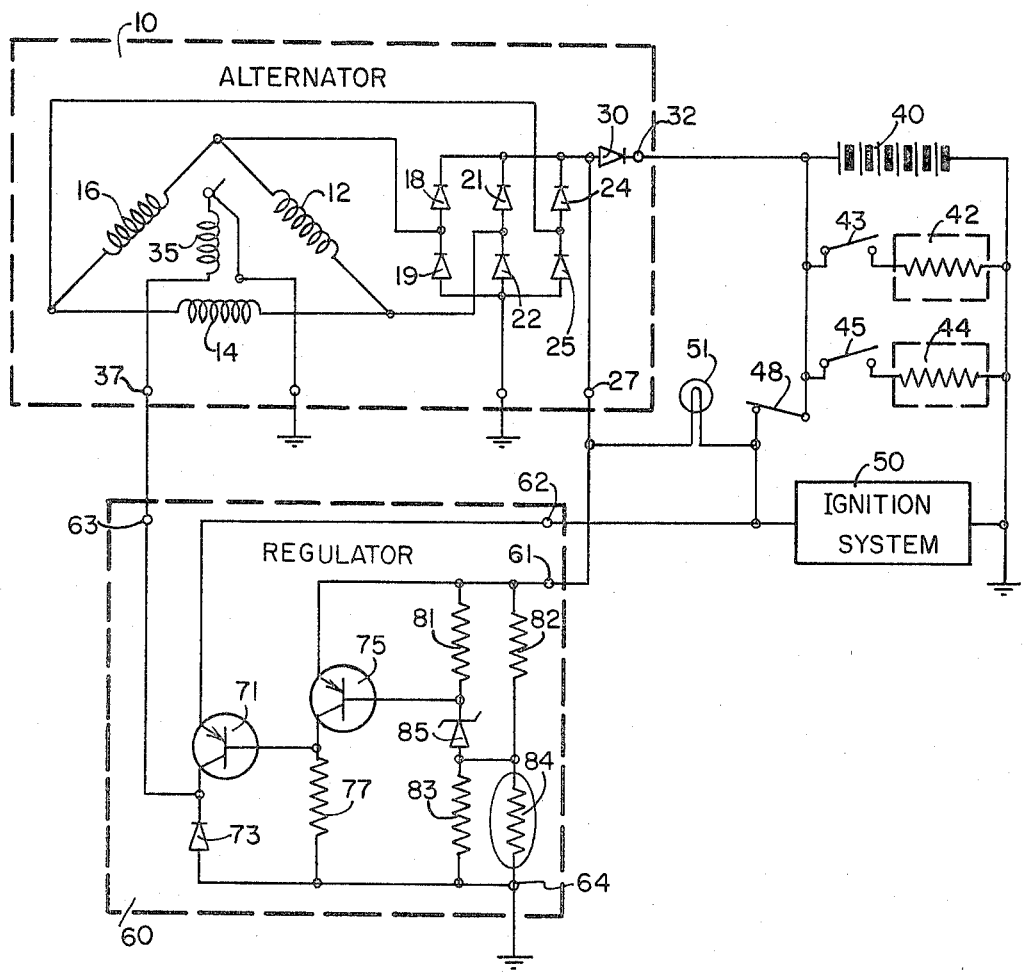
Inventor
JEROME P. FRYSZTAK
By Mueller & Aichele
Attys.

United States Patent Office 3,379,958
Patented Apr. 23, 1968

3,379,958
TRANSISTORIZED VOLTAGE REGULATOR PROVIDING REVERSE BIAS FOR OUTPUT TRANSISTOR
Jerome P. Frysztak, Glendale Heights, Ill., assignor to Motorola, Inc., Franklin Park, Ill., a corporation of Illinois
Filed June 25, 1964, Ser. No. 377,847
2 Claims. (Cl. 322—59)

ABSTRACT OF THE DISCLOSURE

Transistorized voltage regulator for alternator-rectifier DC generator having output connected through isolation diode to the battery for charging the same. The output transistor of the regulator controls the current to the field of he alternator in accordance with the output voltage. When the output transistor is cut off, the voltage drop across the isolation diode is applied to reverse bias the output transistor so that it cuts off rapidly and leakage current therethrough at high temperatures is prevented.

---

This invention relates to vehicular electrical systems, and more particularly to an alternator-regulator system for a vehicle, which system has improved high temperature stability.

Many modern vehicles have electrical systems incorporating alternators and voltage regulators. The alternator may be connected to a storage battery to charge the battery through a diode which prevents discharge of the battery. The voltage regulator incorporated in such system conducts current to the alternator field winding and cuts off such field current when the alternator output exceeds a given level. This maintains the average output voltage of the alternator at a desired predetermined level.

The voltage regulator of the above described system may incorporate a transistor for conducting and cutting off field current, and problems have been encountered when operating at high temperatures. Such high temperatures often occur in the engine compartment of a vehicle where the alternator-regulator is usually mounted. For example, when the outside temperature is relatively high and the vehicle is moving slowly so that very little air enters the engine compartment, temperatures in the neighborhood of 180 to 200° F. are not uncommon. At such high temperatures, leakage current through the output transistor of the regulator, when the transistor is cut off, may be high enough to maintain a relatively strong alternator field. This field strength may be sufficient to cause the alternator output to exceed the desired voltage level, especially where there is a low electrical load on the alternator. This could result in damage to the battery or other equipment in the vehicle. Circuit modifications to reduce or eliminate leakage current in the output transistor of the regulator are often expensive and complex.

Accordingly, it is an object of this invention to provide an improved and low cost alternator-regulator system.

Still another object of the invention is to provide an alternator-regulator system with improved high temperature stability.

A feature of the invention is the provision of an alternator-regulator system with the regulator having an output transistor which is reverse biased by the drop across a diode during the transistor's non-conductive periods.

Still another feature of the invention is the provision of an alternator-regulator system connected to the battery through an isolation diode with an output transistor controlling the alternator field current having its emitter connected to one side of the diode, and its base connected to the other side of the isolation diode through a control transistor.

The drawing is a schematic diagram of a vehicular electrical system constructed in accordance with the invention.

In accordance with the invention, an alternator-regulator system includes an alternator having a field winding and a full wave rectifier system supplying direct current for charging a storage battery. The system further includes a regulator having a normally conductive output transistor connected between the alternator output and the field winding for supplying current to the field winding. The alternator rectifier system is corrected to the battery through an isolation diode to prevent discharge of the battery. A control circuit is connected to the ouput transistor and is responsive to a given level of alternator output voltage to cut the transistor off and thereby reduce the field strength. The control circuit also connects the output transistor to the isolation diode so that the transistor is reverse biased by the voltage drop across the isolation diode when the control circuit cuts the output transistor off.

Referring more particularly to the drawing, the alternator 10, which may be driven from the engine of a vehicle in which the electrical system is incorporated, includes armature windings 12, 14 and 15 connected in delta. As an alternative a Y connection could also be used. The corners of the delta are connected to the respective inter-connections of the power rectifier pairs 18, 19 and 21, 22 and 24, 25. The anodes of the rectifiers 19, 22 and 25 are all inter-connected to the frame of the alternator, or a reference ground. The cathodes of rectifiers 18, 21 and 24 are inter-connected to an intermediate output terminal 27 of the alternator. A direct current voltage, positive with respect to the reference point, appears at terminal 27 in response to full-wave rectification of the three-phase output of the armature windings 12, 14 and 16, and the bank of rectifiers.

An isolation diode 30, which may be included with rectifiers 18, 19 and 21, 22 and 24, 25 as a structural part of the alternator 10, is connected between the output terminal 27 and the further output terminal 22. The diode 30 is poled to provide conduction from the alternator to the output terminal 32. A field winding 35 of the alternator is connected through the usual slip rings and brushes to the ground conductor or frame of the alternator and to a field current supply terminal 37.

A storage battery 40, providing for example 12 volts, is connected between the output terminal 32 of the alternator and the reference point of the electrical system. Various items of electrical equipment are shown representatively connected to the battery 40. These include an electrical load 42 series connected with a control switch 43 across the battery 40, and an electrical load 44 series connected with switch 45 across the battery 40. The electrical loads 42, 44 could represent such items as a starter for the vehicle, lights for the vehicle, a radio for the vehicle, or any other piece of electrical equipment.

An ignition switch 48 connects the positive terminal of battery 40 to the ignition system 50 for an internal combustion engine of the vehicle. An indicator light 51, sometimes referred to as a no-charge or a tell-tale light, is connected between the intermediate alternator terminal 27 and the ignition switch 48. It is the purpose of light 51 to indicate whether or not the alternator is properly charging the battery.

In order to maintain a desired voltage level at the output terminal 32 of alternator 10 for charging battery 40, a voltage regulator 60 is connected to the field winding 35 of the alternator to control the current conducted thereto and hence the output level of the alternator. The transistorized voltage regulator 60 has an input terminal 61 connected to the intermediate terminal 27 of the alternator 10, and a further input terminal 62 connected through the ignition switch 48 to the battery 40. The regulator further includes an output or field current supply terminal 63, connected to terminal 37 of the alternator. Regulator 60 is connected to ground or the reference point for the electrical system through a ground terminal 64.

Regulator 60 includes an output transistor 71, which is a PNP power transistor. Transistor 71 has an emitter electrode connected to terminal 62 and a collector electrode connected to terminal 63. A diode 73 is effectively connected across the field winding 35 to damp reverse transients, caused by sudden cut off of transistor 71, from damaging the transistor. Field current is therefore supplied, when transistor 71 is conductive, from the battery 40 to the field winding 35.

A control circuit is connected to transistor 71 and is responsive to the output voltage level of the alternator to control the conduction of transistor 71 and hence the flow of field current. This control circuit includes a transistor 75 having an emitter portion connected to terminal 61 and a collector portion grounded through resistor 77. The base portion of transistor 71 is connected to the juncture between resistor 77 and the collector portion of transistor 75. Accordingly, when transistor 75 is non-conductive, the base of transistor 71 will be at a lower potential than the potential at the emitter of transistor 71, holding transistor 71 normally conductive.

The control circuit of the regulator further includes a voltage divider comprised of resistors 81, 82, 83 and 84 and Zener diode 85. Resistor 84 is temperature sensitive to provide stabilization of the voltage divider for variations in ambient temperature. The juncture between resistor 81 and diode 85 is connected to the base portion of transistor 75. The voltage divider extends between terminal 61 and terminal 64.

When the output voltage of the alternator, sensed at terminal 27, exceeds a predetermined level, the voltage across Zener diode 85 will be sufficient to cause the diode to break down into reverse conduction. When this occurs, the base of transistor 75 will be at a lower potential than the emitter thereof, causing transistor 75 to conduct. Conduction of transistor 75 raises the base of transistor 71 to the potential of terminal 27 of the alternator. Since the emitter portion of transistor 71 is connected to the positive terminal of battery 40, and since isolation diode 30 is interposed between terminal 27 and the positive terminal of battery 40, the voltage drop across diode 30 will be applied to transistor 71 from base to emitter. This places a reverse bias on transistor 71, providing a rapid and clean cut off and further preventing leakage current through transistor 71.

By applying a reverse bias to transistor 71 during the period in which it is cut off, leakage current through the transistor to the field winding 35 of alternator 10 is prevented. At high temperature, low load condition, such leakage current could maintain sufficient strength in the field of the alternator to hold the output of the alternator at dangerously high levels despite the fact that regulator 10 was functioning to cut off transistor 71. The prevention of leakage current is accomplished without the addition of components to the system, thereby maintaining the cost at virtually the same level.

It may, therefore, be seen that the invention provides an improved and economical alternator-regulator system for use in a vehicle, which system provides high temperature stability at low cost.

I claim:

1. An alternator-regulator system including in combination, an alternator having a field winding and rectifier means having a first terminal at which a direct output voltage is developed, a second terminal for connection to a storage battery, an isolation diode connecting said first terminal to said second terminal for supplying current thereto, and a regulator including an output transistor having base, emitter and collector electrodes, means for connecting said emitter electrode to said second terminal and said collector electrode to said field winding for supplying current to said field winding, and control means connected to said first terminal and to said base electrode for controlling the conduction of said transistor, said control means applying a potential to said base electrode for normally holding said transistor conductive and for cutting off said transistor to terminate the supply of field current in response to a given level of voltage at said second terminal, said control means applying the potential from said first terminal to said base electrode so that the drop in voltage across said isolation diode is applied between said base and emitter electrodes of said transistor when said transistor is cut off for reverse biasing said transistor, whereby rapid cut off of said transistor is accomplished and the flow of leakage current through said transistor at high temperatures is prevented.

2. An alternator-regulator system in accordance with claim 1 wherein said control means includes a control transistor having base, emitter and collector portions with said emitter portion being connected to said first terminal and said collector portion being connected to said base electrode of said output transistor, and means applying a voltage to said base portion of said control transistor for rendering said control transistor conducting in response to said given level of voltage at the first terminal of the alternator, said control transistor when conducting connecting said first terminal to said base electrode of said output transistor to cut off said output transistor.

References Cited

UNITED STATES PATENTS

| 2,980,843 | 4/1961 | Conger et al. | 322—28 |
| 3,121,837 | 2/1964 | Holm et al. | 322—28 |
| 3,185,916 | 5/1965 | Brewster | 322—28 |
| 3,193,755 | 7/1965 | Zelina | 322—28 |
| 3,210,645 | 10/1965 | Domann | 322—28 |
| 3,211,989 | 10/1965 | Mintz et al. | 317—33 X |
| 3,237,087 | 2/1966 | Greenberg | 317—33 X |
| 3,253,210 | 5/1966 | Cummins | 322—28 |
| 3,293,536 | 12/1966 | Byles | 322—28 |

MILTON O. HIRSHFIELD, *Primary Examiner.*

R. V. LUPO, *Assistant Examiner.*